March 14, 1961 H. A. O'BRIEN 2,975,407

ERASE FORWARD

Filed March 3, 1958 5 Sheets-Sheet 1

*INVENTOR.*
HUGH A. O'BRIEN

*BY* Edwin Lester
ATTORNEY

March 14, 1961 H. A. O'BRIEN 2,975,407
ERASE FORWARD
Filed March 3, 1958 5 Sheets-Sheet 3

March 14, 1961 H. A. O'BRIEN 2,975,407

ERASE FORWARD

Filed March 3, 1958 5 Sheets-Sheet 4

March 14, 1961 H. A. O'BRIEN 2,975,407

ERASE FORWARD

Filed March 3, 1958 5 Sheets-Sheet 5

United States Patent Office 2,975,407
Patented Mar. 14, 1961

2,975,407

ERASE FORWARD

Hugh A. O'Brien, Wappingers Falls, N.Y., assignor to International Business Machines Corporation, New York, N.Y., a corporation of New York Filed Mar. 3, 1958, Ser. No. 718,861

8 Claims. (Cl. 340—174.1)

This invention relates to recording and more particularly to a method of and an arrangement for improving recording reliability.

Information may be recorded on a record medium such as magnetic tape in the form of magnetized spots with the basic unit of information consisting of a binary coded character. A variable number of characters may be grouped together to form a word of information and a variable number of words may be grouped together to thereby form a variable length record of information.

During a recording operation, when the end of a record of information is reached, the magnetic tape unit is signalled to stop the forward movement of the magnetic tape. The magnetic tape then deaccelerates until it reaches a stationary position. During the period of deacceleration a certain amount of magnetic tape is consumed on which no information is recorded. When another write operation is called for, the magnetic tape unit is again signalled to start moving the magnetic tape which now accelerates from the stationary position to its normal operating speed. The actual recording of the next record of information on the magnetic tape is delayed for a predetermined period to allow sufficient time for the magnetic tape to attain its normal operating speed. Consequently, during the period of acceleration, a certain amount of magnetic tape is also consumed on which no information is recorded. Therefore, successive records of information are separated by record gaps upon which no information is recorded to allow for the stop/start time of the magnetic tape.

The characters of information recorded on the magnetic tape may be represented in binary form by a code which may consist of six information bits and a check bit, all of which are recorded in parallel vertically across the magnetic tape, that is, perpendicular to the edge of the tape. An even parity may be chosen whereby the check bit is made a 1 or 0 so that the total number of 1 bits in each binary coded character of information is even. Hence, the reliability of the recording may be ascertained by making a vertical check of each character of information reproduced from the magnetic tape, that is, by making an even parity check to detect errors which occur when there is a failure to record a 1 bit on the magnetic tape or when a 1 bit is erroneously reproduced from the magnetic tape so that an odd rather than even number of 1 bits appear in the character of information being reproduced.

Permanent tape defects such as splices, scratches, minute particles of ferrous material embedded in the oxide layer of the magnetic tape, wearoffs or flakeoffs of the oxide layer, tears, etc., may be the cause of the error which would interfere with the later correct reproduction of the information during a read operation. A recent development which permits detection of recording errors during a write operation is the two gap magnetic head of the type which is fully described and claimed in the copending application Serial Number 580,894 filed April 26, 1956 in the names of Victor R. Witt, et al., now Patent No. 2,922,231 issued January 26, 1960, and assigned to the same assignee as the present application. The two gap magnetic head is a magnetic transducer having both a write and read section which are physically very close together and yet are magnetically shielded from each other to permit simultaneous recording and reproducing without the recording interfering with the reproduction. With this arrangement it should be realized that a character of information can be recorded at the same time that a previously recorded character of information is being reproduced and checked thereby permitting a record of information to be checked during a write operation and before a read operation is called for.

Accordingly, an object of the invention is to detect and erase recordings from defective areas of a record medium.

Another object of the invention is to record information on non-defective areas of a record medium.

Still another object of the invention is to relegate defective portions of a record medium to the record gap areas between successive recordings.

A further object of the invention is to provide variable length record gaps between successive recordings.

A still further object of the invention is to provide an arrangement whereby after a record defect is detected, the record medium is backspaced and then forward spaced to erase the defective record.

Another object of the invention is to provide an arrangement whereby after a defective record is detected, the recording medium is backspaced a unit record and then forward spaced a predetermined period of time during which the rewriting of the record is delayed to permit the defective record to be erased.

Still another object of the invention is to improve the reliability of information recorded on a magnetic tape.

Other objects of the invention will be pointed out in the following description and claims and illustrated in the accompanying drawings, which disclose, by way of example, the principle of the invention and the best mode, which has been contemplated, of applying that principle.

Figures 16, 17:
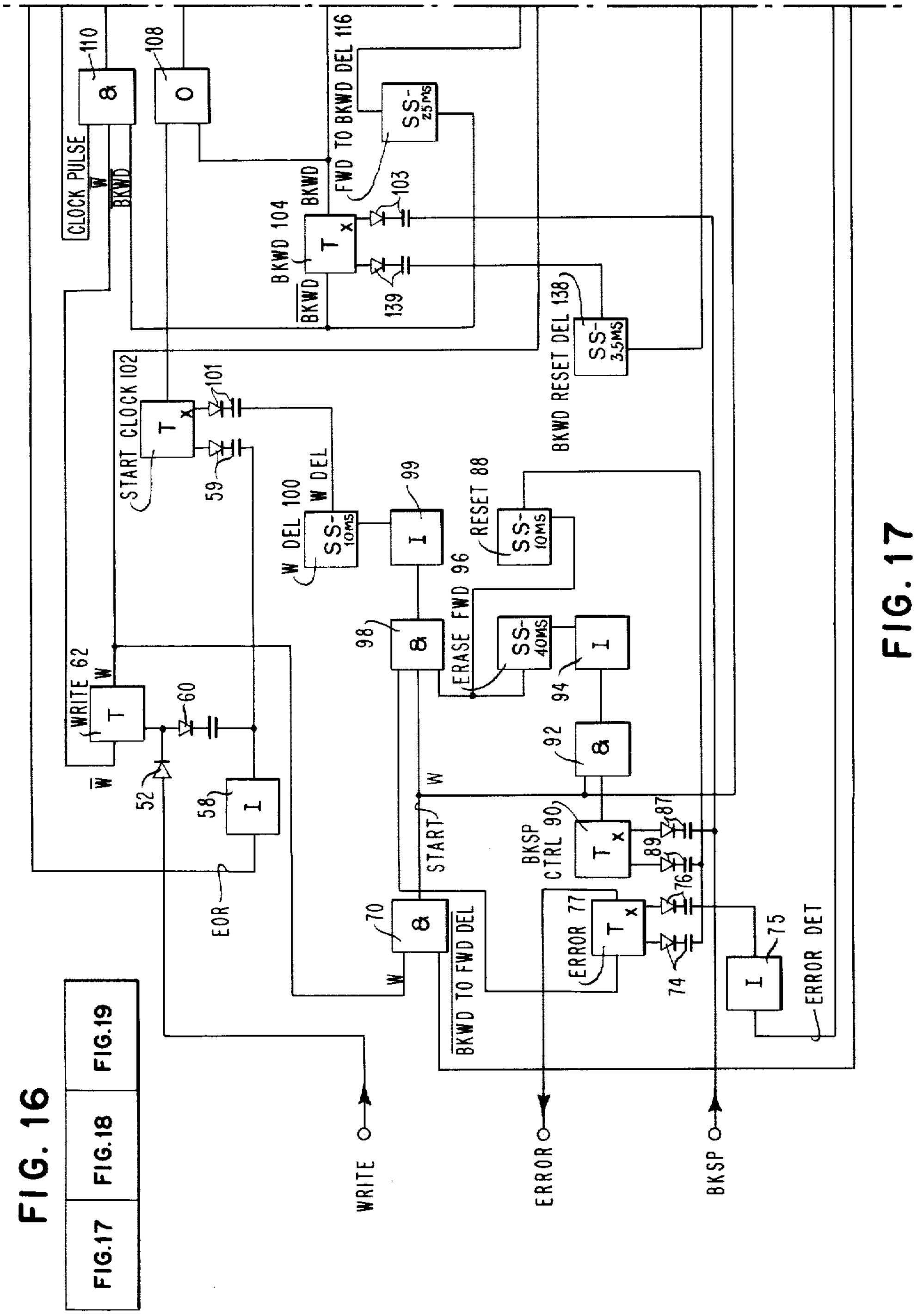
Fig. 16 illustrates how Figs. 17, 18 and 19 may be placed to form a composite diagram showing the erase forward circuitry.
Figure 18:
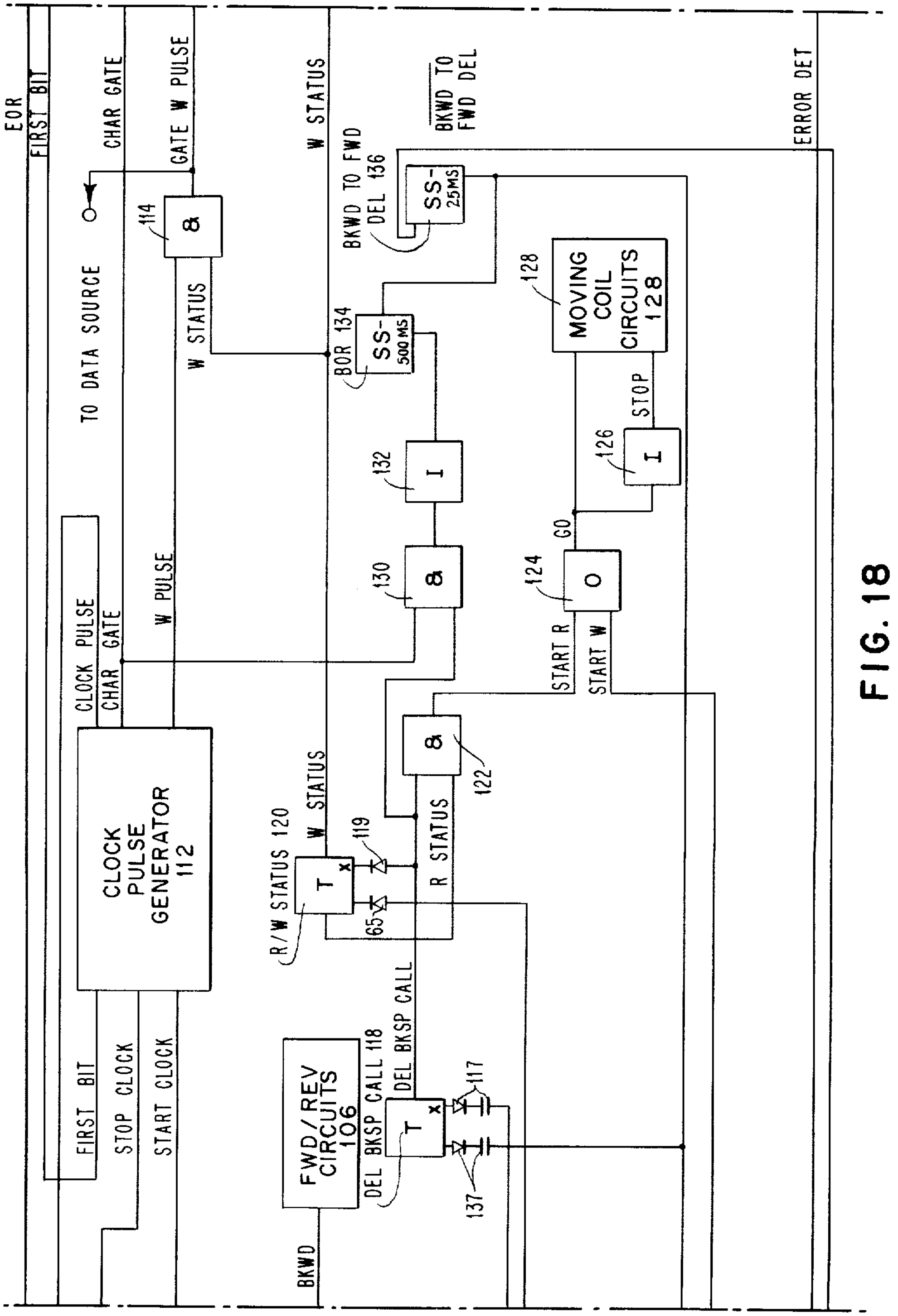
Figure 19:
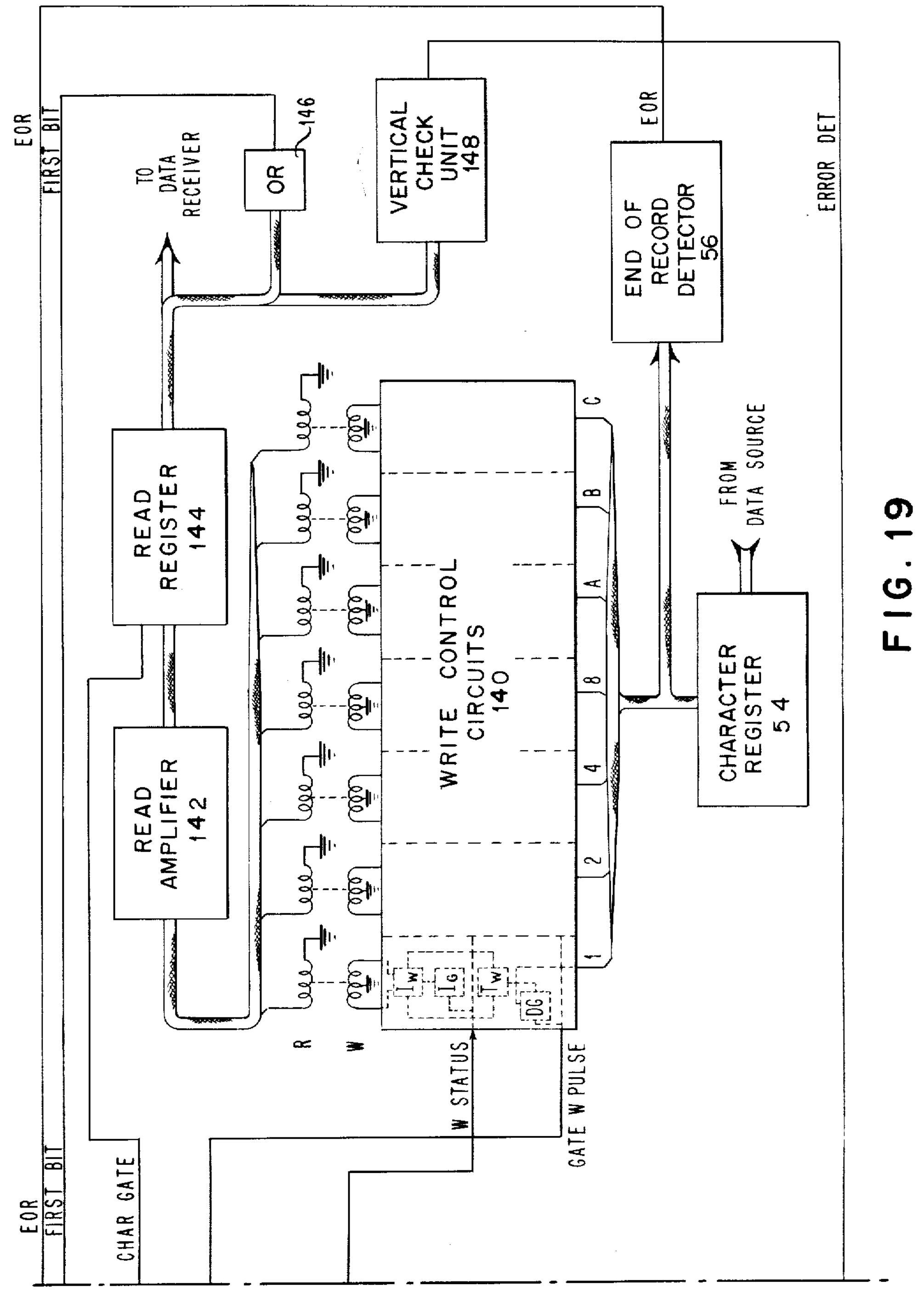

Figs. 17, 18, and 19 taken together show the detailed circuitry of the erase forward mode of operation.

*General description*

Before proceeding to a detailed description of erase forward, a general description will be given of the erase forward mode of operation with reference being made to Figs. 1 to 15, inclusive.

Figure 1:
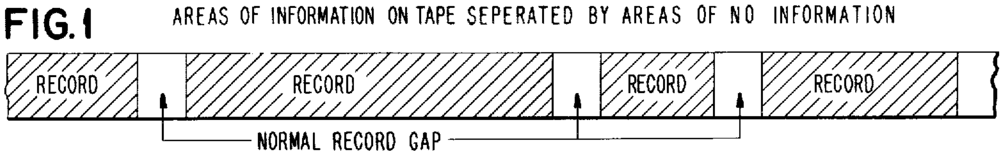
Fig. 1 shows a tape section having variable length records separated by record gap areas.

Referring first to Fig. 1, there is shown a magnetic tape on which variable length records are recorded as indicated by the shaded areas. The records are separated by normal record gap areas which are approximately ¾ inch gaps representing approximately 10 millisecond periods of time to allow for the periods of deacceleration necessary to bring the magnetic tape to a stop and the periods of acceleration necessary to subsequently bring the magnetic tape up to normal operating speed.

The method of recording information on the magnetic tape may be the non-return-to-zero (IBM—NRZI) wherein saturating current of one polarity or the other is applied to the write windings of the two-gap heads during a write operation. A 1 bit is written by reversing the direction of the saturating current flow in the appropriate write winding so that the polarity of the saturation recording reverses at that point. A 0 bit is written by continued saturation in the same direction. Also, erasing a previous recording is accomplished in the same manner as recording a 0 bit, that is, continued saturation in the same direction. During a read operation, saturating current is removed from the write windings of the two gap heads and the read windings sense a change of flux for a 1 bit and the absence of a change of flux for a 0 bit.

Figures 2, 3:
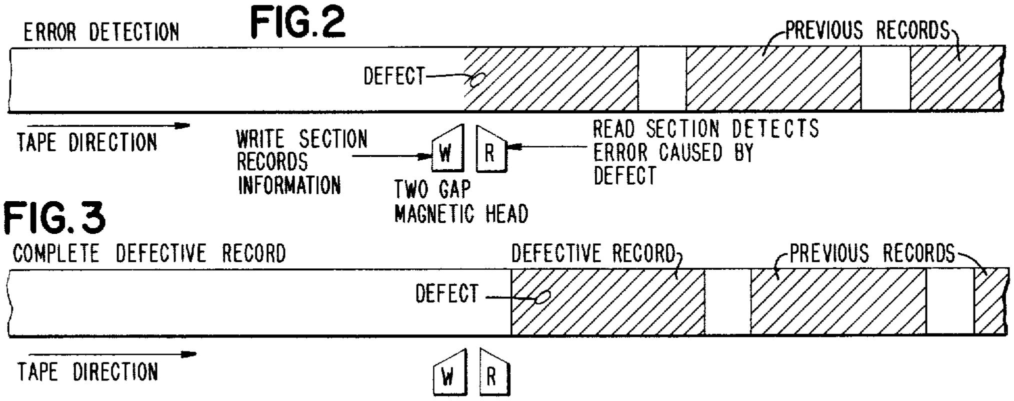
Fig. 2 illustrates the write section of a two gap head recording while the read section is reproducing a recording from a defective area of a tape section.
Fig. 3 shows the completion of the recording of the defective record on the tape section.

Referring now to Fig. 2, let it be assumed that a series of records are being recorded on the magnetic tape and that the present record is being recorded over an area of the tape which includes a defect. The magnetic heads being of the two gap variety permits a character of information to be recorded on the tape while a previously recorded character is reproduced and vertically checked. Thus, in the instance shown, that portion of the magnetic tape which includes the defect is passing over the read section of the two gap head and, consequently, an erroneous character is reproduced indicative of the tape defect.

Referring now to Fig. 3, the recording operation continues until the record is completely recorded on the magnetic tape at which point the forward movement of the magnetic tape stops.

Figure 4:
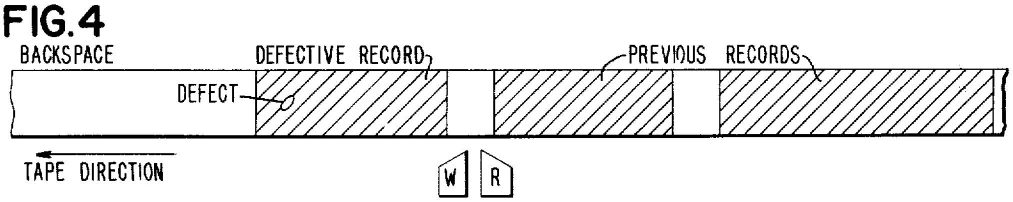
Fig. 4 illustrates a tape section which has been backspaced a unit record so that the defective record appears before the two gap head.

Referring now to Fig. 4, a check is made to determine if an error was detected during the previous write operation. If an error was detected, the tape unit is set to a read status so as to remove erasing current from the write windings of the magnetic heads, and the tape is then backspaced until the beginning of the defective record is beyond the magnetic heads. At the end of the backspacing operation, the magnetic tape is stopped and the tape unit is set to a write status causing erasing current to be applied to the write windings of the magnetic heads.

Figure 5:
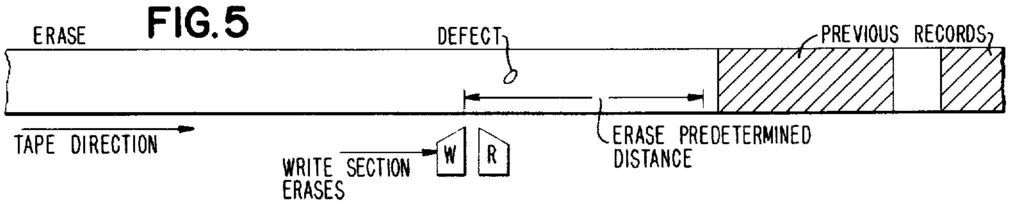
Fig. 5 shows the tape section being forward spaced with the write section of the two gap head erasing the recording an arbitrary distance including the defective area.
Figure 6:
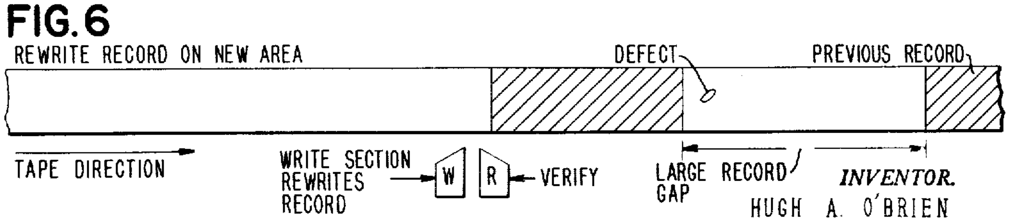
Fig. 6 illustrates the completion of the rerecording of the record on new area of tape and the new record being separated from the previous record by a large record gap which includes the defective area.

Referring now to Fig. 5, another write operation is called for and the magnetic tape unit is signalled to move the tape in a forward direction but to delay the recording operation for a predetermined period of time. During this predetermined period of time, the saturating currents in the write windings of the magnetic heads constantly magnetize the magnetic tape in one direction to effectively erase the previous recording along a predetermined distance of the magnetic tape. In the instant case, the predetermined period of time is sufficient to permit the entire previous record, including the recording on the defective area, to be erased. At the end of this predetermined period, the recording operation commences and the record is rewritten on a new area of the magnetic tape as shown in Fig. 6. It will now be apparent that a long record gap separates the new record from the previous record with the defective area appearing within the large record gap on which no recording is made.

There may be instances when the length of record is longer in time than the period of the large record gap and, therefore, requiring several erase forward operations. Thus, referring now to Fig. 7, let it be assumed that a write operation is being performed and that along record of information is being recorded on the magnetic tape. In the instance shown, the read section of the magnetic head is sensing the recording on a defective area of the magnetic tape. Consequently, an erroneous character is sensed indicative of the tape defect.

Figures 7, 8, 9, 10, 11, 12, 13, 14, 15:
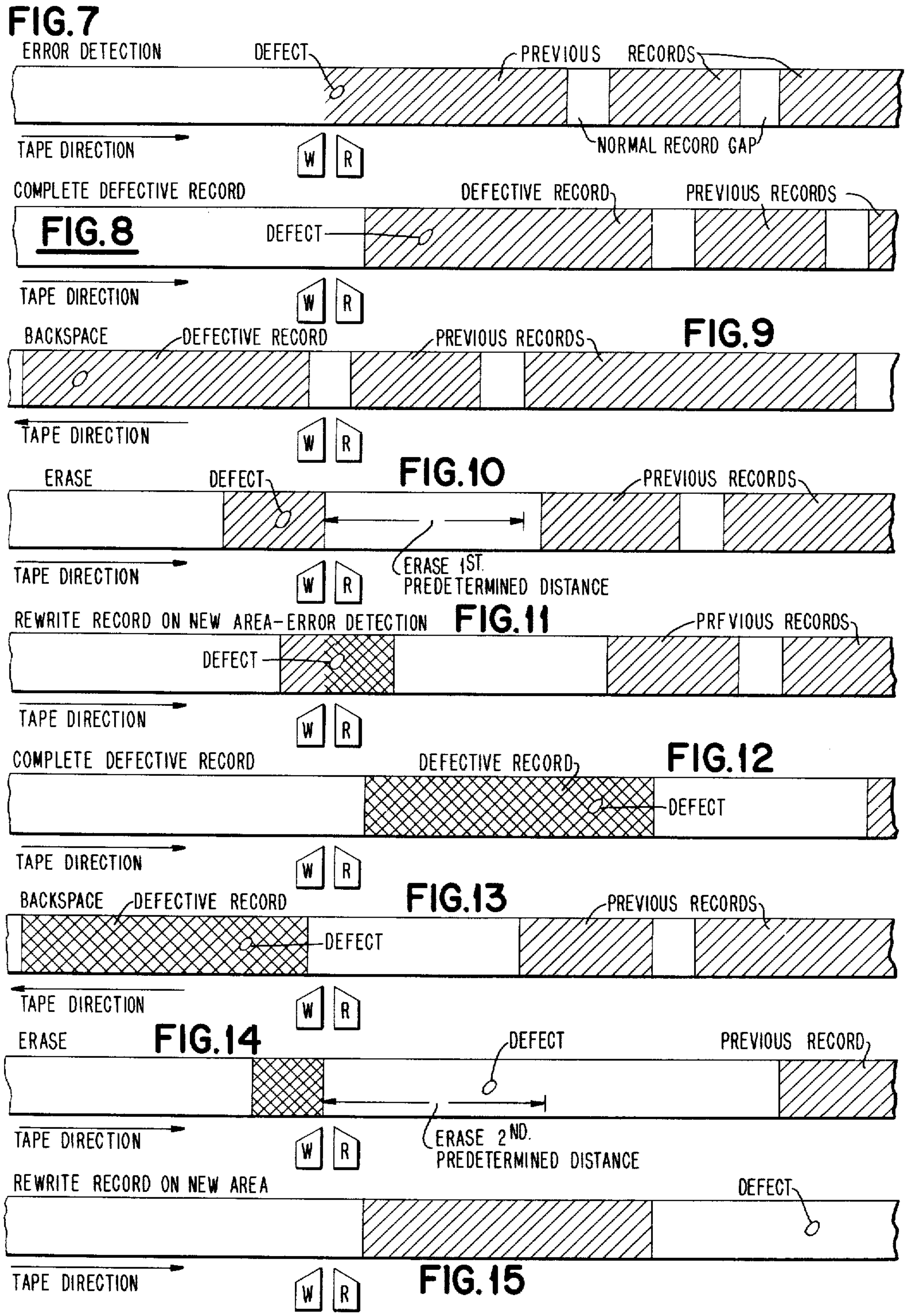
Fig. 7 shows the write section of a two gap head recording while the read section is reproducing a recording from a defective area of the tape section near the end of a long record.
Fig. 8 illustrates the completion of the recording of the defective record on the tape section.
Fig. 9 shows the tape section having been backspaced a unit record so that the long defective record appears before the two gap head.
Fig. 10 illustrates the tape section being forward spaced with the write section of the two gap head erasing the recording a first arbitrary distance which does not include the defective area.
Fig. 11 shows the tape section being forward spaced with the write section of the two gap head rerecording the record on a new area of the tape while the read section is reproducing a recording from the defective area of the tape section.
Fig. 12 illustrates the completion of the rerecording of the defective record on the tape section.
Fig. 13 shows the tape section having been backspaced a unit record so that the new defective record now appears before the two gap head.
Fig. 14 illustrates the tape section being forward spaced with the write section of the two gap head erasing the recording a second arbitrary distance which includes the defective area.
Fig. 15 shows the completion of the rerecording of the record on a new area of tape with the defective area appearing in the large record gap area.

Referring now to Fig. 8, the remainder of the record is recorded on the magnetic tape after which the forward movement of the tape is stopped. Following this, referring to Figs. 9 and 10, a similar process is performed as that described in conjunction with Figs. 4 and 5, that is, the tape is backspaced and then forward spaced to erase the recording along a first predetermined distance of the magnetic tape. However, in the instant case, it will be noted that the erased portion of the magnetic tape does not include the defective area inasmuch as the length of the defective record is longer than the predetermined distance.

Referring now to Fig. 11, at the end of the predetermined period, the recording operation commences and the record is rewritten on a new area of tape as indicated by the cross hatched portion. At the instance shown, the defective area is passing over the read section of the magnetic head, and consequently, an erroneous character is reproduced indicative of the tape defect.

Following this, referring to Figs. 12 to 15, inclusive, a similar process is performed as that described in conjunction with Figs. 3 to 6, inclusive, that is, the recording of the defective record is completed, the tape is backspaced and then forward spaced to erase the recording along a second predetermined distance of the magnetic tape, after which the recording operation commences and the record is rewritten on a new area of the magnetic tape. It should be noted that the defective area now appears in the second erased portion of the magnetic tape and the record rewritten on the magnetic tape is separated from the previous record by a long record gap which is approximately twice that shown in Fig. 10.

Thus, the reliability of information recorded on a magnetic tape is improved inasmuch as recordings on defective areas of tape are erased and the defective areas relegated to the record gap areas between successive valid recordings.

*Detailed description*

Before proceeding to the detailed description, reference will be made to Figs. 17, 18 and 19 of the drawings.

The type of logical circuits represented by the rectangles in Figs. 17, 18 and 19 consist of OR circuits (0), AND circuits (&), inverter circuits (I), trigger circuits (T) having separately operable set and reset imputs and single shot multivibrators (SS) all of which are well known in the art. Examples of suitable types of these logical circuits are fully described in the copending application Serial No. 592,545 filed June 20, 1956 in the names of Ralph A. Gregory, et al. and assigned to the same assignee as the present invention. Throughout the detailed description of the erase forward device no reference will be made to logically passive elements such as cathode followers, level setters and the like. It should be obvious that the characteristics of these passive elements vary and are largely determined not only by the component load but also by the length of the couplings between components. Therefore, in a specific construction of the device in accordance with the principles of the present invention, the passive elements may be used wherever and in any manner that is deemed necessary.

Additionally, only so much of the tape feeding mechanism is shown in block form as is necessary to understand the invention. Those shown in block form are the moving coil circuits which control the starting and stopping of the magnetic tape, the forward/reverse circuits which control the direction of movement of the magnetic tape, that is, forward or backward, and the write control circuits which control the recording and erasing of information on the magnetic tape. An example of a suitable tape feeding mechanism which may be employed is that which is fully described in the copending application Serial No. 468,832 filed November 15, 1954 in the names of Walter S. Buslik, et al., now Pat. No. 2,919,076 issued December 29, 1959 and assigned to the same assignee as the present invention.

Furthermore, referring to Figs. 18 and 19, suitable types of read amplifier, read register, vertical check unit, character register, end of record detector and clock pulse generator, all shown in block form, may be found fully described in the aforementioned application to Ralph A. Gregory, et al.

The erase forward mode of operation may be manuelly controlled in that switches may be selectively operated to supply the necessary control signals in the proper sequence or the operation may be controlled by a Data Processor, which, operating in accordance with a program of instructions, supply the necessary control signals in the proper sequence. Thus, the first instruction of the program may be a write instruction causing a record of information to be transferred from the Data Processor to the magnetic tape. While the record of information is being recorded on the magnetic tape, the information is coincidently reproduced and vertically checked and if a vertical error is detected, due to a tape defect, an error trigger is turned on to store an indication of the error.

A Pogram Interrupt System, such as that which is fully described and claimed in the co-pending application Serial No. 701,372 filed December 9, 1957 in the names of Frederick P. Brooks, Jr., et al. and assigned to the same assignee as the present invention, may be utilized to automatically interrupt the main program upon detecting the write error. Thus, after executing the write instruction, a transfer may be made to an error correction routine which consists of backspacing the magnetic tape a unit record after which a transfer may be made back to the original write instruction of the main program to rewrite the record of information on the magnetic tape. However, in view of the fact that an error was detected, the rerecording is delayed for a predetermined period of time during which the previous recording is erased along an arbitrary portion of the tape which portion of the tape includes the defect. At the end of the predetermined period of delay, the record is rewritten on the tape with the tape defect appearing in the record gap area between the present record and the previous record and will not be reproduced during a subsequent read operation.

Initially, let it be assumed that all of the triggers in Figs. 17 to 19 are in their OFF state whereby the right hand tube of each trigger is rendered conductive, as indicated by the letter *x* appearing in the lower right hand corner of the rectangle, causing a negative signal to be produced at the right hand output thereof while the left hand tube is rendered non-conductive causing a positive signal to be produced at the left hand output thereof.

Now, let it be assumed that a record of information is to be transferred from a Data Source to the magnetic tape. Consequently, a write instruction is given causing a positive pulse to be applied via the WRITE line and the diode 52 to turn ON the WRITE trigger 62. The WRITE trigger 62 in being turned ON applies a positive signal from its right hand output to the W line and a negative signal from its left hand output to the $\overline{W}$ line. The negative signal on the $\overline{W}$ line is applied to decondition the AND circuit 110 while the positive signal on the W line is applied via diode 65. in Fig. 18, to turn ON the R/W STATUS trigger 120. The R/W STATUS trigger 120 in being turned ON applies a positive signal from its right hand output to the W STATUS line and applies a negative signal from its left hand output to the R STATUS line. The negative signal on the R STATUS line is applied to decondition the AND circuit 122 while the positive signal on the W STATUS line is applied to condition the AND circuit 114 and the WRITE CONTROL CIRCUITS 140 in Fig. 19.

The WRITE CONTROL CIRCUITS 140 consist of a plurality of identical control units corresponding to the bit positions of a character of information. Each control unit includes a dual triode write inverter $I_w$, a single triode inverter $I_g$, a write trigger $T_w$ and a diode gate DG. The cathodes of the dual triode write inverter $I_w$ are commonly connected to the anode of the inverter $I_g$ while the anodes are each connected respectively to one end of the write windings of the write section of the associated two-gap magnetic head.

The grid of the inverter $I_g$ is connected to the W STATUS line and, consequently, when a negative signal is maintained thereon, as it will be during a READ operation, the inverter $I_g$ is rendered non-conductive causing a relatively positive potential to be applied from the anode thereof to the cathodes of the inverter $I_w$ whereby each side of the inverter $I_w$ is blocked from being conductive so that no saturating current flows through the write windings of the write section of the two-gap head. However, when a positive signal is maintained on the W STATUS line, as it will be during a WRITE operation, then, the inverter $I_g$ is rendered conductive causing a relatively negative potential to be applied from the anode thereof to the cathodes of the inverter $I_w$ whereby one side or the other of the inverter is rendered conductive depending upon the state of the write trigger $T_w$, the outputs of which are respectively connected to the grids of the inverter $I_w$.

Thus, if the write trigger $T_w$ is in the ON state, a positive signal is applied from the right hand output thereof to the grid of the right hand triode of the inverter $I_w$ causing that triode to be conductive and apply saturating current in a direction from the right hand end of the write winding to ground while a negative signal is applied from the left hand output thereof to the grid of the left hand triode of the inverter $I_w$ causing that triode to be non-conductive. Likewise, if the write trigger $T_w$ is in the OFF state, the conditions are reversed, that is, the left hand triode of the inverter $I_w$ is rendered conductive causing saturating current to flow in the opposite direction, that is, from the left hand end of the write winding to ground while the right hand triode is rendered non-conductive.

Therefore, it should be apparent that, during a WRITE operation, saturating current is continuously flowing through the WRITE windings in one direction or the other. A bit 1 is recorded on the magnetic tape by reversing the direction of saturating current flow in the write windings whereas a bit 0 is recorded by continued saturating current flow in the same direction. Hence, when reading information from the magnetic tape, a bit 1 is sensed by a change of flux whereas a bit 0 is sensed by the absence of a change of flux.

The reversal of the direction of saturating current flow for writing a bit 1 and the continued saturating current flow for writing a bit 0 is controlled by the diode gate DG in conjunction with the write trigger $T_W$. The diode gate DG has one input connected to the GATE W PULSE line and another to the corresponding bit output of the CHARACTER REGISTER 54. Thus, if a bit 1 is stored in the corresponding bit position of the character register, then, a positive signal is applied to condition the diode gate DG to pass a positive pulse on the GATE W PULSE line to switch the write trigger $T_W$ from one state to the other. The write trigger $T_W$ in switching from one state to the other causes the conductive state of the write inverter $I_W$ to be switched whereby a reversal of the direction of saturating current flow occurs in the write windings of the two-gap magnetic head. However, if a bit 0 is stored in the corresponding bit position of the character register, then, a negative signal is applied to decondition the diode gate DG to block the positive pulse on the GATE W PULSE line from passing therethrough to switch the state of the write trigger $T_W$ whereby no reversal of the direction of saturating current flow occurs.

Referring now to Fig. 18, since the magnetic tape is not presently backspacing, the BKWD TO FWD DEL single shot 136 is in its OFF state causing a positive signal to be applied to the $\overline{\text{BKWD TO FWD DEL}}$ line. The positive signal on the $\overline{\text{BKWD TO FWD DEL}}$ line is applied to condition the AND circuit 70 in Fig. 17. Now, when the positive signal is applied to the W line, it passes via the now conditioned AND circuit 70 to the START W line. Since the ERROR trigger 76 is in its OFF state, a positive signal is applied from its left hand output as a conditioning signal to the AND circuit 98. Also, since the ERASE FWD single shot 96 is in its OFF state, a positive signal is applied from its left hand output as a second conditioning signal to the AND circuit 98. Consequently, since two of the inputs of the AND circuits 98 have positive signals maintained thereon, the AND circuit 98 is conditioned so that when the positive signal appears on the START W line, it passes via the AND circuit 98 to the inverter 99 where it is inverted to a negative signal to turn on the 10 millisecond W DEL single shot 100. At the same time, a positive signal on the START W line passes via the OR circuit 124 in Fig. 18 to the GO line. The positive signal on the GO line signals the MOVING COIL CIRCUITS 128 to initiate movement of the magnetic tape. Additionally, referring to Fig. 17, since the BKWD trigger 104 is in its OFF state, a negative signal is maintained on the BKWD line to permit the forward magnet in the FWD/REV CIRCUITS 106 to control the tape feed so that the magnetic tape will feed in a forward direction.

The 10 millisecond write delay of the W DEL single shot 100 is provided to allow ample time for the magnetic tape to accelerate up to its normal operating speed. At the end of the 10 millisecond write delay period, the W DEL single shot 100 returns to its OFF state causing a negative signal to be applied to the W DEL line where it passes via a negative shift circuit 101 to turn on the START CLOCK trigger 102. The START CLOCK trigger 102 in being turned ON applies a positive signal from its right hand output via the OR circuit 108 and the START CLOCK line to initiate operation of the CLOCK PULSE GENERATOR 112.

At the proper time, the CLOCK PULSE GENERATOR 112 produces a positive pulse on the W PULSE line which passes via the now conditioned AND circuit 114 to the GATE W PULSE line. The positive pulse on the GATE W PULSE line is applied to the data source to initiate the transfer of a character of information therefrom to the CHARACTER REGISTER 54 in Fig. 19. The positive pulse on the GATE W PULSE line is also applied to the WRITE CONTROL CIRCUITS 140 in Fig. 19, to gate the character presently stored in the CHARACTER REGISTER 54 to the write sections of the two gap heads so that the character may be recorded on the magnetic tape. Thus, the 1 bit outputs from the CHARACTER REGISTER 54 are applied to corresponding sections of the WRITE CONTROL CIRCUITS 140 to condition the diode gates therein in preparation for receiving the pulse on the GATE W PULSE line. At the trailing edge of the positive pulse on the GATE W PULSE line, those of the diode gates in the WRITE CONTROL CIRCUITS 140 which are conditioned, pass the negative shift of potential to switch the state of the associated write triggers $T_W$ causing a reversal of the direction of saturating current flow through the write section of the associated magnetic heads so that corresponding 1 bits are recorded on the magnetic tape. The CLOCK PULSE GENERATOR 112 continues to cycle and, at the proper time in each cycle, initiates signalling the WRITE CONTROL CIRCUITS 140 to cause the character presently stored in the CHARACTER REGISTER 54 to be transferred to and recorded on the magnetic tape and also initiates signalling the data source to transfer the next character of the record to the CHARACTER REGISTER 54. Additionally, each character transferred from the CHARACTER REGISTER 54 to the WRITE CONTROL CIRCUITS 140 is monitored by the END OF RECORD DETECTOR 56 which is so designed as to detect a particular coded character representing the end of the record.

As soon as the first character recorded on the magnetic tape passes over the read portion of the magnetic heads it is sensed and applied to the READ AMPLIFIER 142 where it is amplified and transferred to and stored in the READ REGISTER 144 which consists of a plurality of triggers (not shown).

In the tape unit, the magnetic tape passes between guides as it moves over the magnetic heads. These guides are designed for nominal tape width plus the maximum tolerance. However, if the width of the tape varies, the magnetic tape may pass loosely in the guide and become displaced so that the bits of a character of information, which are normally written perpendicular to the edge of the magnetic tape and is read in parallel, may assume a slight angle to the edge of the tape with the resulting effect being that the bits of the character are not written simultaneously and are consequently read serially rather than in parallel. This displacement is known as tape skew and causes the 1 bits of a character to be sequentially stored in the READ REGISTER 144. As soon as the first 1 bit is sensed by one of the triggers of the READ REGISTER 144, a positive signal is applied therefrom via the OR circuit 146 to the FIRST BIT line.

The positive signal on the FIRST BIT line in Fig. 19 is applied to the CLOCK PULSE GENERATOR 112 in Fig. 18 wherein it is used to start a character gate counter (not shown) which is thereafter controlled by the clock of the CLOCK PULSE GENERATOR 112 to produce a positive pulse on the CHAR GATE line. Thus, for each character stored in the READ REGISTER 144, the first bit thereof is sensed to initiate production of a character gate pulse. The positive pulse on the CHAR GATE line is applied without effect to the AND circuit 130 which is deconditioned by the negative signal on the DEL BKSP CALL line due to the negative signal appearing at the right hand output of the DEL BKSP CALL trigger 118. However, the positive pulse on the CHAR GATE line is also applied to the READ REGISTER 144 with the negative trailing edge thereof being effective to reset the triggers of the READ REGISTER 144. The period from the time that the first bit 1 of a character is sensed to the time that the trailing edge of the character gate pulse occurs is made sufficiently long to insure that the entire character is sensed and stored in the READ REGISTER 144, for the worst condition of tape skew, before it is transferred on to the data receiver. Thus, during a READ operation, the READ REGISTER 144 in being reset effectively gates the character stored theerin, parallel by bit, to the data receiver. However, during a WRITE operation, though the character is still effectively gated to the data receiver, the data receiver simply ignores it and the resetting merely operates to clear the READ REGISTER 144 in preparation for receiving the next character of information read from the magnetic tape.

As each character of the record of information is read from the magnetic tape and stored in the READ REGISTER 144, a vertical check is made by the VERTICAL CHECK UNIT 148, that is, an even parity check is made to detect single bit errors such as occur when a 1 bit fails to be recorded or when a 1 bit is erroneously recorded so that an odd rather than an even number of 1 bits appear in the character. If a vertical check error is detected for VERTICAL CHECK UNIT 148 produces a positive signal on the ERROR DET line which is applied to the inverter 75 in Fig. 17 where it is inverted to a negative signal to turn ON the ERROR trigger 77. The ERROR trigger 77 in being turned ON applies a negative signal from its left hand output via the ERROR line to decondition the AND circuit 98 and a positive signal from its right hand output via the ERROR line to provide an error indication to the Program Interrupt System of the type disclosed in aforementioned Brooks, et al. application.

Meanwhile, the write operation continues until a specially coded character designating the end of the record is detected by the END OF RECORD DETECTOR 56 producing a positive signal on the EOR line. The positive signal on the EOR line is applied to an inverter 58 in Fig. 17 where it is inverted to a negative signal and applied via the negative shift input circuit 60 to turn OFF the WRITE trigger 62. The WRITE trigger 62 in being turned OFF applies a negative signal from its right hand output to the W line and a positive signal from its left hand output to the $\overline{\text{W}}$ line. The positive signal on the $\overline{\text{W}}$ line is applied in combination with the positive signal on the $\overline{\text{BKWD}}$ line to condition the AND circuit 110 so that when the CLOCK PULSE GENERATOR 112 next produces a clock pulse on the CLOCK PULSE line it passes via the now conditioned AND circuit 110 and the STOP CLOCK line 61 to the CLOCK PULSE GENERATOR 112 to stop the cycling of the CLOCK PULSE GENERATOR 112. The negative signal on the W line is applied to decondition the AND circuit 70 causing a negative signal to be applied to the START W line which, in turn, is applied via the OR circuit 124 in Fig. 18 to bring down the GO line. The GO line in coming down applies a negative signal to the inverter 126 where it is inverted to a positive signal and applied via the STOP line to the MOVING COIL CIRCUITS 128 of the tape feed mechanism so that the forward movement of the magnetic tape is stopped.

This ends the WRITE operation and, assuming that a write error has been detected, the Program Interrupt System now takes over causing an interrupt routine to be performed during which a backspace operation will be called for followed by a write operation which will erase a portion of the magnetic tape including the tape defect and rewrite the record on a new area of the magnetic tape.

Thus, at the proper time, a positive pulse is applied to the BKSP line in Fig. 17, the trailing edge of which is effective via the negative shift input circuit 87 to turn ON the BKSP CTRL trigger 90 and the negative shift input circuit 103 to turn ON the BKWD trigger 104. The BKSP CTRL trigger 90 in being turned ON applies a positive signal from its right hand output to condition the AND circuit 92 while the BKWD trigger 104 in being turned ON applies a negative signal from its left hand output to the $\overline{\text{BKWD}}$ line and a positive signal from its right hand output to the BKWD line. The negative signal on the $\overline{\text{BKWD}}$ line is applied to decondition the AND circuit 110 and to turn ON the 25 millisecond FWD TO BKWD DEL single shot 116 which remains ON for a period of 25 milliseconds to allow sufficient time, when the reverse solenoid in the FWD/REV CIRCUITS 140 is energized, for the electro-mechanical linkages to transfer positions before movement of the magnetic tape is initiated.

The positive signal on the BKWD line is applied to the FWD/REV CIRCUITS 106 and via the OR circuit 108 to the START CLOCK line. The FWD/REV CIRCUITS 106 respond to the positive signal on the BKWD line by energizing the reverse solenoid therein in preparation for feeding the tape in the backward direction while the positive signal on the START CLOCK line is applied to initiate operation of the CLOCK PULSE GENERATOR 112.

At the end of the 25 millisecond period, the FWD TO BKWD DEL single shot 116 returns to its OFF state causing a negative signal to be applied from its right hand output via the negative shift input circuit 117 to urn ON the DEL BKSP CALL trigger 118. The DEL BKSP CALL trigger 118 in being turned ON applies a positive signal from its right hand output to the DEL BKSP CALL line. The positive signal on the DEL BKSP CALL line is applied to condition the AND circuits 122 and 130 and via the diode 119 to turn OFF the R/W STATUS trigger 120. The R/W STATUS trigger 120 in being turned OFF applies a negative signal from its right hand output to the W STATUS line and applies a positive signal from its left hand output to the R STATUS line. The negative signal on the W STATUS line is applied to decondition the AND circuit 114 and to decondition the WRITE CONTROL CIRCUITS 140 in Fig. 19 thereby blocking any further conduction through the write windings of the magnetic heads associated therewith as explained hereinbefore. The positive signal on the R STATUS line passes via the now conditioned AND circuit 122 to the START R line. The positive signal on the START R line passes via the OR circuit 124 to bring up the GO line which signals the MOVING COIL CIRCUITS 128 of the tape feeding mechanism and in conjunction with the reverse solenoid being energized causes the magnetic tape to be driven in a reverse or backward direction.

Now, as the tape moves backward, the first character sensed by the read portions of the magnetic heads is the last character of the record which, after being reproduced, is applied to the read amplifier 142 where the signals representing the character are amplified and then applied to the READ REGISTER 144. As soon as the first 1 bit is sensed by one of the triggers of the READ REGISTER 144, a positive signal is applied therefrom via the OR circuit 146 to the FIRST BIT line. The positive signal on the FIRST BIT line is applied to the CLOCK PULSE GENERATOR 112 in Fig. 17 to start the character gate counter (not shown) which shortly thereafter produces a positive pulse on the CHAR GATE line. The positive pulse on the CHAR GATE line is applied to the AND circuit 130 which is now conditioned by the positive signal on the DEL BKSP CALL line and, consequently, passes therethrough to the inverter 132 where it is inverted to a negative pulse to turn ON the 500 microseconds BOR single shot 134. It should be noted that the CHAR GATE line is brought up for each character read from the magnetic tape. However, the record of information being backspaced over is read at a nominal rate which is less than the 500 microsecond period of the BOR single shot 134. Consequently, the BOR single shot 134 is maintained ON during the entire backspacing operation by the successive signals on the CHAR GATE line until the beginning of the record of information is reached and no further characters are read so that the CHAR GATE line is no longer pulsed.

Hence, 500 microseconds after the last character is sensed, that is, the beginning of the record, the BOR single shot 134 returns to its OFF state causing a negative signal to be applied from its right hand output to turn ON the BKWD TO FWD DEL single shot 136 for 25 milliseconds. The 25 millisecond delay period is provided to allow sufficient time, when the forward solenoid in the FWD/REV CIRCUITS 140 is energized, for the electromechanical linkages to transfer positions before the forward movement of the magnetic tape is re-initiated. The BKWD TO FWD DEL single shot 136 in being turned ON applies a negative signal from its left hand output and via the $\overline{\text{BKWD TO FWD DEL}}$ line to decondition the AND circuit 70 during this delay period so that if a write instruction is next called for, the write signal will be blocked until the electro-mechanical linkages have transferred positions.

At the same time, the negative signal from the right hand output of the BOR single shot 132 is applied via the negative input circuit 137 to reset the DEL BKSP CALL trigger 118 and to turn ON the 3.5 millisecond BKWD RESET DEL single shot 138. The DEL BKSP CALL trigger 118 in being reset applies a negative signal from its right hand output to the DEL BKSP CALL line to decondition the AND circuits 122 and 130. The AND circuit 122 in being deconditioned applies a negative signal to the START R line which condition passes via the OR circuit 124 to the GO line. The negative signal on the GO line is applied to the inverter 126 where it is inverted to a positive signal and applied via the STOP line to signal the MOVING COIL CIRCUITS 128 of the tape feeding mechanism to stop the movement of the magnetic tape. The 3.5 millisecond BKWD RESET DELAY is provided to allow sufficient time for the magnetic tape to come to a complete stop before the mechanical linkages are rendered operative to transfer to the forward drive.

Hence, 3.5 milliseconds later, the BKWD RESET DEL single shot 138 returns to its state causing a negative signal to be applied via a negative shift input circuit 139 to turn OFF the BKWD trigger 104. The BKWD trigger 104 in being turned OFF applies a negative signal from its right hand output via the BKWD line to the FWD/REV CIRCUITS 106 to de-energize the reverse solenoid and energize the forward solenoid to permit a forward drive the next time the tape feeding mechanism is rendered operative. The BKWD trigger 104 in being turned OFF also applies a positive signal from its left hand output via the $\overline{\text{BKWD}}$ line as a conditioning signal to the AND circuit 110. Consequently, since positive signals are maintained on the $\overline{\text{W}}$ line and $\overline{\text{BKWD}}$ line, the AND circuit 110 is now conditioned to pass the next succeeding clock pulse on the CLOCK PULSE line via the STOP CLOCK line to the CLOCK PULSE GENERATOR 112 to stop the cycling of the clock therein.

At the end of the 25 millisecond BKWD TO FWD DELAY period, the BKWD TO FWD DEL single shot 136 returns to its OFF state causing a positive signal to be applied from its left hand output via the $\overline{\text{BKWD TO FWD DEL}}$ line to condition the AND circuit 70 in preparation for the next write instruction.

The situation which now exists is the same as that shown in Fig. 4 wherein the defective record is in front of the magnetic heads. Another write instruction is called for and a positive signal is applied via the WRITE line and the diode 52 to turn ON the WRITE trigger 62. The WRITE trigger 62 in being turned on applies a positive signal from its right hand output to the W line and a negative signal from its left hand output to the $\overline{\text{W}}$ line. The negative signal on $\overline{\text{W}}$ line is applied to decondition the AND circuit 110. The positive signal on the W line is applied via diode 65 to turn ON the R/W STATUS trigger 120 causing a negative signal to be applied from its left hand output to the R STATUS line and a positive signal to be applied from its right hand output to the W STATUS line. The negative signal on the R STATUS line is applied to decondition the AND circuit 122 while the positive signal on the W STATUS line is applied to the WRITE CONTROL CIRCUITS 140 to cause saturating current to pass through the write coils of the magnetic heads so as to saturate the magnetic material on the tape.

The positive signal on the W line also passes via the conditioned AND circuit 70 to the START W line. Since the ERROR trigger 77 is ON, a negative signal is maintained on the $\overline{\text{ERROR}}$ line to decondition the AND circuit 98 and block the positive signal on the START W line from passing therethrough.

However, the positive signal on the START W line is applied via the OR circuit 124 and the GO line to signal the MOVING COIL CIRCUITS 128 of the tape feeding mechanism which in conjunction with the forward solenoid being energized causes the magnetic tape to be moved in a forward direction. So long as no information is being written on the magnetic tape, the saturating current passing through the write coils of the magnetic heads continue to magnetize the magnetic tape in the same direction at all times and therefore effectively erase whatever is recorded thereon.

Since the BKSP CTRL trigger 90 is still ON, a positive signal is applied from its right hand output to condition the AND circuit 92 so that the positive signal on the START W line also passes therethrough to the inverter 94 where it is inverted to a negative pulse and applied to turn ON the ERASE FWD single shot 96 for a period of 40 milliseconds during which time the magnetic tape continues to be erased.

The ERASE FWD single shot 96 in being turned ON applies a negative signal from its left hand output to turn ON the RESET single shot 88 for 10 milliseconds and to decondition the AND circuit 98. At the end of the 10 millisecond period, the RESET single shot 88 returns to its OFF state causing a negative signal to be applied via the negative shift input circuits 74 and 89, respectively, to turn OFF the ERROR trigger 77 and the BKSP CTRL trigger 90. The ERROR trigger 77 in being turned OFF applies a positive signal from its left hand output via the $\overline{\text{ERROR}}$ line to the AND circuit 98 which however is blocked by the negative signal from the ERASE FWD single shot 96.

At the end of the erase forward period, the ERASE FWD single shot 96 returns to its OFF state causing a positive signal to be applied to the AND circuit 98. Since positive signals are maintained on the START W line and the $\overline{\text{ERROR}}$ line, the AND circuit 98 is now conditioned to pass the positive signal from the ERASE FWD single shot 96 to the inverter 99 where it is inverted to a negative signal to turn ON the W DEL single shot 100 for a period of 10 milliseconds which is normally provided to allow the magnetic tape to accelerate to its normal operating speed. During this additional 10 millisecond write delay period, the magnetic tape continues to be erased so that a strip of the magnetic tape equivalent to 50 milliseconds of time is erased before the record is rewritten on the magnetic tape. At the end of this period, the W DEL single shot 100 returns to its OFF state causing a negative signal to be applied from its right hand output via the W DEL line and the negative input circuit 101 to turn ON the START CLOCK trigger 102. The START CLOCK trigger 102 in being turned ON applies a positive signal from its right hand output via the OR circuit 108 to the START CLOCK line. The positive signal on the START CLOCK line is applied to initiate operation of the clock in the CLOCK PULSE GENERATOR 112. From this point on, the remainder of the write operation is similar to that previously described.

It should be apparent that the period of the ERASE FWD single shot 96 is purely arbitrary and may be varied according to the lengths of the records being processed. In any event, if the amount of time that it takes for the tape to move, from the moment its forward movement is initiated to the point at which the defect appears, is less than the erase forward period (50 milliseconds in the example illustrated) then, the defect will appear in an erased portion of the magnetic tape as indicated in Fig. 5. However, if the amount of time is greater than the erase forward period, as it might be in the case of long records, then, the recording over the defective area will not be erased in the initial erase forward operation. Consequently, when the record is rewritten on the new area, a defect will be detected as shown in Fig. 11 and an operation will be performed similar to that shown in Figs. 12 to 15, namely, the defective record continues to be recorded until the end of the record is reached, at which time, the forward movement of the magnetic tape is stopped, the program is interrupted and another fix-up routine is performed in which the defective record is backspaced a unit record and then forward spaced erasing a second arbitrary distance of the magnetic tape which now includes the defective area as indicated in Fig. 14. At the end of this second arbitrary distance the record is again rewritten on a new area of tape as indicated in Fig. 15 with the tape defect relegated to the long record gap area.

Thus, there has been described herein a novel method of and arrangement for improving the reliability of recording information on a magnetic tape so that when processed during a READ operation it will be error free. Additionally, an advantage of this arrangement is that the areas of the magnetic tape containing the tape defects are not permanently obliterated. Consequently, if the defect is temporary in nature, the area of the tape which was previously erased may, when the defect disappears, be used for a valid recording.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data recording system, a record medium, means associated with said record medium for recording a data record thereon, means associated with said record medium and operating concurrently with said recording means for detecting recording errors and means responsive to the detection of a recording error and effective after completion of said recording for cancelling the defective data record and rerecording the data record on a new area of said record medium.

2. In a data recording system as in claim 1 wherein said record medium is a magnetic tape.

3. In a recording system, a record medium, means associated with said record medium and operating concurrently with said recording means for recording records thereon with successive record areas being separated by non-record areas, means associated with said record medium for detecting recording errors, and means responsive to the detection of recording errors for relegating the defective areas of said record medium to the non-record areas.

4. In a recording system, a record medium, means associated with said record medium for recording records thereon with successive record areas being separated by non-record areas, means associated with said record medium and operating concurrently with said recording means for detecting recording errors, means responsive to the detection of a recording error and effective after completing the recording of the record in which the error was detected for cancelling the erroneous record and rerecording the record on a new area of said record medium so that the area in which the recording error was detected appears in the non-record area.

5. In a data recording system, a record medium, recording means associated with said record medium for recording data records thereon, reproducing means associated with said record medium and effective concurrently with said recording means for reproducing said data records, checking means responsive to said reproducing means for checking the reproduced data records for recording errors due to defective areas of said record medium, and means responsive to the detection of a recording error and effective after completion of said recording for cancelling the defective data record and rerecording the data record on a new area of said record medium.

6. In a recording system, a record medium, means for moving said record medium, means for controlling said moving means to move said record medium in a forward direction, means associated with said record medium for recording a record thereon, means associated with said record medium for detecting recording errors, means responsive to the detection of a recording error and effective after completion of said recording for controlling said moving means to move said record medium in a backward direction until the beginning of the record is reached, means effective thereafter for controlling said moving means to move said record medium in a forward direction, and means for controlling said recording means to rerecord the record on said record medium including means for delaying the rerecording for a predetermined period of time during which said recording means is effective to cancel the erroneous recording.

7. In a data recording system, a record medium, means for moving said record medium, means for controlling said moving means to move said record medium in a forward direction, recording means associated with said record medium for recording a data record thereon, reproducing means associated with said record medium and effective concurrently with said recording means for reproducing said data record, data checking means for checking the reproduced data record for recording errors due to defective areas of said record medium, means responsive to the detection of a recording error and effective after completion of said recording for controlling said moving means to move said record medium in a backward direction until the beginning of the data record is reached, means effective thereafter for controlling said moving means to move said record medium in a forward direction, means for signalling said recording means to rerecord the data record on said record medium, and means responsive to said signalling means for delaying the rerecording for a predetermined period of time during which said recording means is effective to cancel the recording over the defective area of said record medium.

8. In a recording system, a record medium, means for signalling a recording operation, means associated with said record medium and responsive to said signalling means for recording a record thereon, means associated with said record medium for detecting recording errors, means responsive to said detecting means for applying a first prohibiting signal to said recording means to prohibit said recording means from responding to subsequent recording operation signals, means effective after completion of said recording for backspacing said record medium to the beginning of said record, said backspacing means including means for producing a signal indicative of said backspacing operation, means responsive to said backspacing operation signal and a subsequent recording operation signal for applying a second prohibiting signal to said recording means for a first predetermined period of time to prohibit said recording means from responding to said subsequent recording operation signal, said recording means including means for erasing the erroneous recording during said first predetermined period of time and means controlled by said second prohibiting signal means for controlling said first prohibiting signal means to remove said first prohibiting signal after a second predetermined period of time which is less than said first predetermined period of time.

References Cited in the file of this patent

UNITED STATES PATENTS

| | | |
|---|---|---|
| 2,793.344 | Reynolds | May 21, 1957 |
| 2,871,464 | Wright et al. | Jan. 27, 1959 |

OTHER REFERENCES

"Apparatus for Magnetic Storage on Three-Inch Wide Tapes," by R. B. Lawrence et al., Proceedings of the Eastern Joint Computer Conference, Dec. 10–12, 1956, pp. 88 and 89.

UNITED STATES PATENT OFFICE

CERTIFICATION OF CORRECTION

Patent No. 2,975,407 March 14, 1961

Hugh A. O'Brien

It is hereby certified that error appears in the above numbered patent requiring correction and that the said Letters Patent should read as corrected below.

Column 13, lines 71 and 72, strike out "and operating concurrently with said recording means" and insert the same after "medium" in line 75, same column.

Signed and sealed this 22nd day of August 1961.

(SEAL)
Attest:

ERNEST W. SWIDER
Attesting Officer

DAVID L. LADD
Commissioner of Patents